Aug. 29, 1939. A. R. FITCH Re. 21,184
GARMENT
Original Filed Jan. 15, 1938
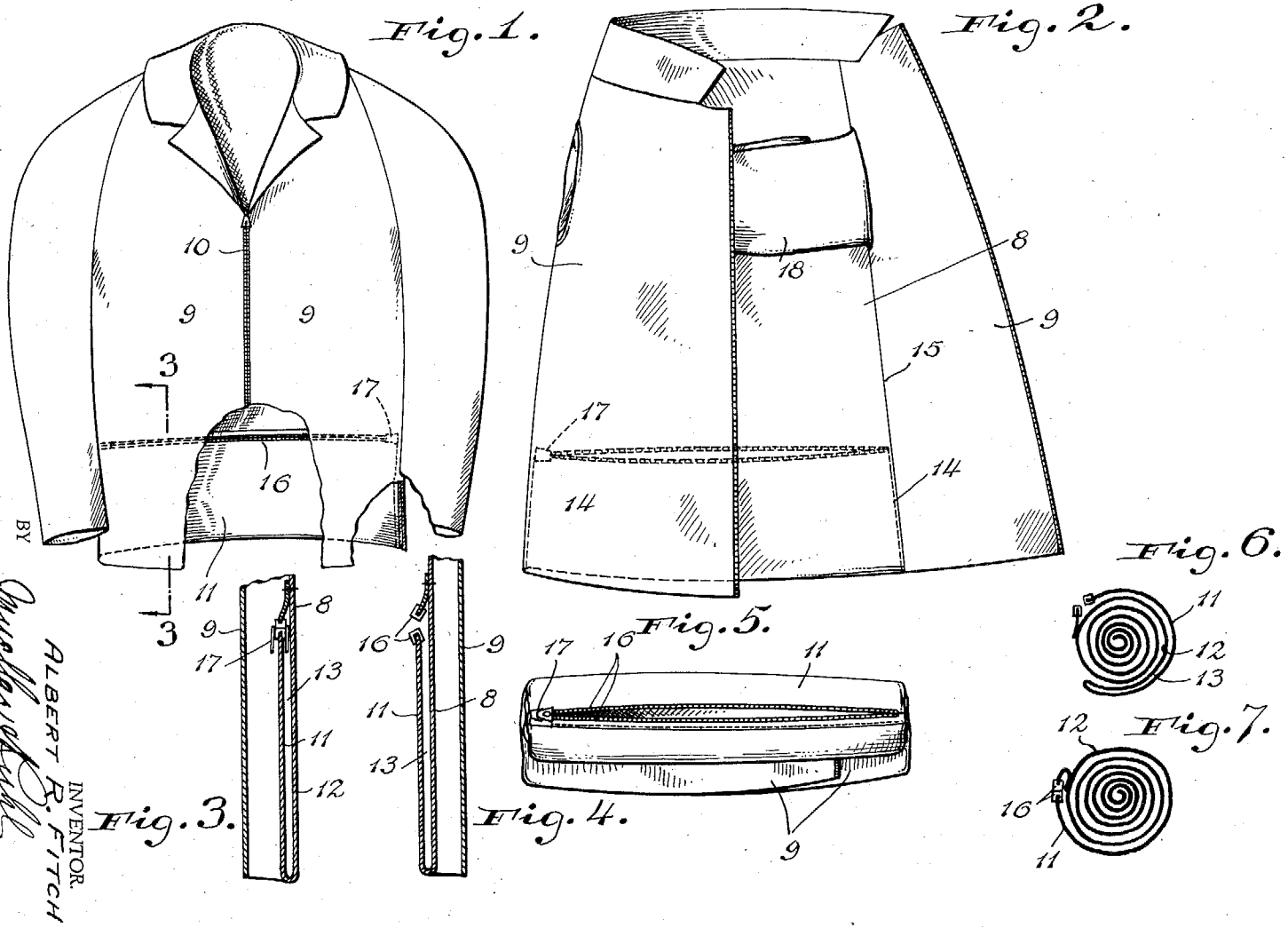
INVENTOR.
ALBERT R. FITCH
BY Mueller & Kuhl
ATTORNEYS Reissued Aug. 29, 1939

Re. 21,184

UNITED STATES PATENT OFFICE 21,184

GARMENT

Albert R. Fitch, Summit, N. J., assignor to Adirondack Sportswear, Inc., Amsterdam, N. Y., a corporation of New York Original No. 2,142,814, dated January 3, 1939, Serial No. 185,115, January 15, 1938. Application for reissue May 23, 1939, Serial No. 275,251

3 Claims. (Cl. 2—93)

This invention relates to improvements in wearing apparel and has particular reference to a garment capable of being folded and contained within a pocket forming a part thereof.

An object of the invention is to provide an improved garment of simple and practical construction in which is incorporated a pocket so positioned in the garment as to be invisible when the latter of being worn, and wherein said pocket is arranged in a manner which will enable the garment to be neatly folded, when not in use, and conveniently enclosed within said pocket to form a small, compact bundle which can be easily carried about.

The above and other objects will appear more clearly from the following detailed description when taken in connection with the accompanying drawing which illustrates a preferred embodiment of the inventive idea.

In the drawing:

Figure 1 is a front elevation of a coat showing the adaption of the present invention thereto.

Figure 2 is an elevation illustrating the coat in a partly folded position preparatory to its insertion into the pocket forming a part thereof.

Figure 3 is a section on the line 3—3 of Figure 1 illustrating the normal position of the pocket, when the coat is being worn.

Figure 4 is a sectional view somewhat similar to Figure 3, showing the position of the pocket during initial stages of the folding operation.

Figure 5 is a plan view illustrating the garment or coat completely folded or rolled, and prepared for the final operation of enclosing the same within the pocket by a reversal, or turning inside out, of a portion of said pocket.

Figure 6 is a transverse sectional view of Figure 5, and,

Figure 7 is a view similar to Figure 6 showing the final operation of reversing the pocket and closing the same.

The invention is illustrated in connection with a coat which may be utilized for sports wear which is capable of being folded or rolled into compact form so as to occupy a minimum of space when not in use. As shown the coat consists of the usual rear panel or section 8 and the two front panels 9 the meeting edges of which may be secured together by suitable means such as the side fasteners 10.

In accordance with the present invention it is proposed to provide the coat with a pocket so situated therein that the same will be invisible when the coat is being worn, during which time said pocket may be utilized to contain various articles, and will be adapted to conveniently receive and enclose the garment in a rolled or folded condition. To this end, the bottom of the rear panel 8 of the coat is extended to form a flap 11 of a width substantially equal to that of the panel 8 and, of a height to impart sufficient depth to the pocket of which said flap forms a part. In forming the pocket, the flap 11 is turned inwardly and upwardly, as best shown in Figure 3 so as to combine with the lower portion 12 of the panel 8 to form the pocket 13 located on the inner side of the coat and at the rear thereof. The vertical end edges of the flap 11 are seamed and stitched to the panel 8 as indicated at 14 along lines which are coincident with the regular seams 15 which join the front and rear panels of the coat. The upper edge of the flap 11 combines with the panel 8 to form an opening for the pocket and suitable means are provided for opening and closing the latter. Preferably, such means take the form of interlocking strips 16 secured along the upper edge of the flap 11 and adjacent portion of the panel 8, with a slide fastener 17 controlling said strips.

It will be apparent from Figures 1 and 3 that when the coat is being worn, the pocket formed by the rear panel 8 and flap 11 will be disposed across the interior of the back of the coat and will be completely invisible but nevertheless accessible should it be desired to use the pocket for the deposit of any articles. When it is desired to fold the garment and contain the same within the pocket 13, the procedure is as follows. The garment is first laid upon a support with the interior thereof faced down, as shown in Figure 2, whereupon the sleeves 18 are first laid and folded across the garment as shown in said figure. The front panels 9 are then folded over, as illustrated at the left of said figure, the folding line being substantially coincident with the seams 15 so that when both panels 9 have been folded over the garment will have been reduced in width to substantially that of the pocket 13 which, at the moment, is exposed on the underside of the garment as shown in Figure 4. With the garment still in the same position on the support, the same may be rolled or folded from the collar end thereof downwardly toward the pocket until the same is in the condition shown in Figures 5 and 6, at which time the flap 11 forms the major portion of the outer convolution of the roll. The slide fastener 17 is in open position at this time and, as the final operation in enclosing the garment within the pocket, the free edge of the flap 11 may now be grasped and pulled to a reversed position, or turned inside out, as shown in Figure 7 and at the same time the rolled garment is tucked into the pocket. When thus adjusted the two fastener strips 16 will be brought into juxtaposition, whereupon the slide 17 may be operated to interlock the two strips and thus secure the pocket in its closed position.

I claim:

1. A foldable garment comprising front and rear panels, a flap formed at the lower end of said rear panel and coextensive in width therewith, certain marginal edges of said flap being secured to said rear panel to form a pocket provided with an opening the width of said rear panel, said garment being foldable to a position to be enclosed within said pocket by insertion through said opening, and means for closing said opening.

2. A foldable garment comprising front and rear panels joined by seams, a flap forming an extension of said rear panel and having its ends terminating at the seams defining the vertical edges of said rear panel with the ends of said flap secured to said rear panel so as to combine therewith to provide a pocket having an opening coextensive with the width of said rear panel, the bottom of said pocket being defined by the lower edges of said rear panel and said flap, and said opening being defined by the upper edge of said flap, the front panels of said garment being foldable along lines substantially coextensive with said seams and the ends of said flap and the latter being reversible from its normal position to enclose adjacent portions of said front panels after the latter have been so folded, said pocket then receiving and enclosing the remainder of said garment after it has been folded, and means to close said opening after the garment is fully contained in said pocket.

3. A foldable garment comprising a plurality of vertically extending panels, a flap formed within said garment at the lower end of a predetermined one of said panels and substantially co-extensive in width therewith, certain marginal edges of said flap being secured to said predetermined panel to form a pocket provided with an opening substantially equal in width to the width of said predetermined panel, said garment being foldable to a position to be enclosed within said pocket by insertion through said opening, and means for closing said opening.

ALBERT R. FITCH.